US011440205B2

(12) United States Patent
Zhang et al.

(10) Patent No.: US 11,440,205 B2
(45) Date of Patent: Sep. 13, 2022

(54) ROBOT JOINT MODULE AND WIRELESS POWER SUPPLY APPARATUS, SYSTEM AND METHOD THEREFOR

(71) Applicant: RETHINK ROBOTICS GMBH, Bochum (DE)

(72) Inventors: Sheng Zhang, Hebei (CN); Ji Long Yao, Beijing (CN)

(73) Assignee: Rethink Robotics GMBH, Bochum (DE)

( * ) Notice: Subject to any disclaimer, the term of this patent is extended or adjusted under 35 U.S.C. 154(b) by 0 days.

(21) Appl. No.: 17/281,191

(22) PCT Filed: Sep. 29, 2018

(86) PCT No.: PCT/CN2018/108811
§ 371 (c)(1),
(2) Date: Mar. 29, 2021

(87) PCT Pub. No.: WO2020/062169
PCT Pub. Date: Apr. 2, 2020

(65) Prior Publication Data
US 2021/0394375 A1 Dec. 23, 2021

(51) Int. Cl.
*B25J 19/00* (2006.01)
*H02J 50/80* (2016.01)
(Continued)

(52) U.S. Cl.
CPC ......... *B25J 19/0045* (2013.01); *B25J 17/025* (2013.01); *H02J 50/40* (2016.02); *H02J 50/80* (2016.02)

(58) Field of Classification Search
CPC ...... B25J 19/0045; B25J 17/025; H02J 50/80; H02J 50/40
(Continued)

(56) References Cited

U.S. PATENT DOCUMENTS 9,124,204 B2 * 9/2015 Takezawa ........... H02P 29/0241
10,418,891 B2 * 9/2019 Takahashi ............. H02M 7/537
(Continued)

FOREIGN PATENT DOCUMENTS

CN 10 254 5397 A 7/2012
CN 10 600 3026 A 10/2016
(Continued)

OTHER PUBLICATIONS

European Search Report dated Mar. 23, 2022, issued in EP Application No. 18934853.5.

*Primary Examiner* — Alfonso Perez Borroto
(74) *Attorney, Agent, or Firm* — Workman Nydegger

(57) ABSTRACT

A robot joint module and a wireless power supply apparatus, system, and method therefor. The apparatus includes: a wireless power receiver arranged at a connecting end of a current robot joint module and adapted to receive electrical power from a previous robot joint module of the current robot joint module; and a wireless power transmitter arranged at an output end of the current robot joint module and adapted to transmit the electrical power to a next robot joint module of the current robot joint module. By receiving electrical power from a previous robot joint module in a wireless power supply mode and sending the electrical power to a next robot joint module in a wireless power supply mode, the electrical power can be transferred between a plurality of robot joint modules, without arranging any power cable. The cost of and difficulty in arranging power cables can be reduced, and cable breakage caused by winding of the power cables can also be avoided, thereby implementing infinite continuous rotation of joints.

14 Claims, 3 Drawing Sheets

(51) Int. Cl.
*H02J 50/40* (2016.01)
*B25J 17/02* (2006.01)

(58) Field of Classification Search
USPC .......................................................... 307/104
See application file for complete search history.

(56) References Cited

U.S. PATENT DOCUMENTS

| | | | |
|---|---|---|---|
| 2017/0098959 A1* | 4/2017 | Kikuchi | .................. H02J 50/40 |
| 2017/0098964 A1* | 4/2017 | Sakata | .................... H02J 50/10 |
| 2017/0098965 A1 | 4/2017 | Kikuchi et al. | |
| 2017/0244284 A1 | 8/2017 | Takahashi et al. | |
| 2018/0152056 A1* | 5/2018 | Takahashi | ............... H02J 50/70 |

FOREIGN PATENT DOCUMENTS

| | | |
|---|---|---|
| CN | 10 610 0149 B | 11/2016 |
| CN | 10 656 0981 A | 4/2017 |
| CN | 206326600 U | 7/2017 |
| CN | 10 850 0967 A | 9/2018 |

\* cited by examiner

ROBOT JOINT MODULE AND WIRELESS POWER SUPPLY APPARATUS, SYSTEM AND METHOD THEREFOR

TECHNICAL FIELD

The present application relates to the field of robots, and in particular to a robot joint module and a wireless power supply apparatus, system, and method therefor.

BACKGROUND

Robots are machines capable of operating automatically. It can receive human commands, run pre-complied programs, and act according to principles and programs formulated by artificial intelligence technology. Robots can include industrial robots, agricultural robots, household robots, medical robots, service robots, space robots, underwater robots, military robots, rescue robots, educational teaching robots, entertainment robots, and the like. Industrial robots are industrial field-oriented multi-joint robotic arms or multi-degree-of-freedom machines, and can operate automatically and implement various functions using their own power and control capabilities.

At present, robot joints are mainly connected through power cables and communication cables. However, whether a robot is to be assembled in a workshop or at a customer site, cable arrangement between joints is always time-consuming and has high requirements for an operator. How to achieve quick and easy joint assembly is a difficulty to be solved.

Moreover, in order to overcome cable breakage caused by winding during cable arrangement, the rotation angle of the joint of the robot is usually limited, and thus it is difficult to implement infinite continuous rotation.

SUMMARY

In view of the above, the main purpose of embodiments of the present invention is to provide a robot joint module and a wireless power supply apparatus, system, and method therefor.

The technical solution of the embodiments of the present invention is implemented as follows:

A wireless power supply apparatus for a robot joint module, including:
  a wireless power receiver arranged at a connecting end of a current robot joint module and adapted to receive electrical power from a previous robot joint module of the current robot joint module; and
  a wireless power transmitter arranged at an output end of the current robot joint module and adapted to transmit the electrical power to a next robot joint module of the current robot joint module.

Hence, in the embodiments of the present invention, a robot joint module can receive electrical power from a previous robot joint module in a wireless power supply mode and send the electrical power to a next robot joint module in a wireless power supply mode. The electrical power can be transferred between a plurality of robot joint modules, without arranging any power cable. The cost of and difficulty in arranging power cables can be reduced, and cable breakage caused by winding of the power cables can be avoided, thereby implementing infinite continuous rotation of joints.

In one embodiment, the apparatus further includes a wireless communication module adapted to execute at least one of the following processes:
  receiving, from a robot controller, a control instruction adapted to control the current robot joint module;
  sending a status parameter of the current robot joint module to the robot controller;
  receiving, from a handheld terminal, a control instruction adapted to control the current robot joint module;
  sending a status parameter of the current robot joint module to the handheld terminal;
  establishing, with the previous robot joint module of the current robot joint module, a first handshaking session for receiving the electrical power; and
  establishing, with the next robot joint module of the current robot joint module, a second handshaking session for transmitting the electrical power.

Therefore, in the embodiments of the present invention, a robot joint module can receive a control instruction from a robot control device and send a status parameter to the robot control device, without any communication cable. The cost of and difficulty in arranging communication cables can be reduced, and cable breakage caused by winding of the communication cables can be avoided, thereby implementing infinite continuous rotation of joints.

In one embodiment, the wireless communication module is arranged inside a joint body of the robot joint module.

By arranging a wireless communication module inside a joint body of a robot joint module, the layout space can be saved and the structure of the joint module can be simplified.

A robot joint module, including:
  a joint body including a connecting end, an output end, and a rear cover end; a main board arranged inside the joint body;
  a wireless power receiver arranged at the connecting end and adapted to receive electrical power from a previous robot joint module of a current robot joint module; and
  a wireless power transmitter arranged at the output end and adapted to transmit the electrical power to a next robot joint module of the current robot joint module.

Hence, in the embodiments of the present invention, electrical power is received from a previous robot joint module in a wireless power supply mode and the electrical power is sent to a next robot joint module in a wireless power supply mode. The electrical power can be transferred between a plurality of robot joint modules, without arranging any power cable. The cost of and difficulty in arranging power cables can be reduced, and cable breakage caused by winding of the power cables can be avoided, thereby implementing infinite continuous rotation of joints.

In one embodiment, the robot joint module further includes:
  a wireless communication module arranged on the main board and adapted to execute at least one of the following processes:
  receiving, from a robot controller, a control instruction adapted to control the current robot joint module;
  sending a status parameter of the current robot joint module to the robot controller;
  receiving, from a handheld terminal, a control instruction adapted to control the current robot joint module;
  sending a status parameter of the current robot joint module to the handheld terminal;
  establishing, with the previous robot joint module of the current robot joint module, a first handshaking session for transmitting the electrical power; and establishing, with the next robot joint module of the current robot joint module, a second handshaking session for transmitting the electrical power.

Therefore, in the embodiments of the present invention, a robot joint module can receive a control instruction from a robot control device and send a status parameter to the robot control device, without any communication cable. The cost of and difficulty in arranging communication cables can be reduced, and cable breakage caused by winding of the communication cables can be avoided, thereby implementing infinite continuous rotation of joints.

Moreover, the wireless communication module exerts a collaborative effect in the process of transferring electrical power with other robot joint modules.

In one embodiment, the wireless power receiver is arranged on an end surface of the connecting end.

Therefore, the wireless power receiver of the current robot joint module can be well aligned with the wireless power transmitter arranged on an end surface of the output end of the previous robot joint module to improve electrical power transmission efficiency.

In one embodiment, the wireless power transmitter is arranged on an end surface of the output end.

Therefore, the wireless power transmitter of the current robot joint module can be well aligned with the wireless power receiver arranged on the end surface of the connecting end of the next robot joint module to improve electrical power transmission efficiency.

A robot, including the foregoing robot joint module.

In one embodiment, the robot is a collaborative robot.

Wireless connection between joint modules provided in the embodiments of the present invention can significantly reduce the size of the robot. The implementation and application of the joint modules provided in the embodiments of the present invention to a collaborative robot can satisfy the strict requirements of the collaborative robot for miniaturization of the robot.

A wireless power supply system for a robot joint module, including:
  a first robot joint module adapted to receive electrical power from a previous robot joint module of the first robot joint module in a wireless power supply mode, or receive electrical power from a robot controller in a wired power supply mode; and
  a second robot joint module connected to an output end of the first robot joint module and adapted to receive the electrical electric from the first robot joint module in a wireless power supply mode.

Therefore, electrical power can be transferred between a plurality of robot joint modules, without arranging any power cable. The cost of and difficulty in arranging power cables can be reduced, and cable breakage caused by winding of the power cables can be avoided, thereby implementing infinite continuous rotation of joints.

In one embodiment, the system further includes:
  a third robot joint module connected to an output end of the second robot joint module and adapted to receive the electrical power from the second robot joint module in a wireless power supply mode.

A wireless power supply method for a robot joint module, including:
  receiving electrical power from a previous robot joint module of a current robot joint module in a wireless power supply mode, or receiving electrical power from a robot controller in a wired power supply mode; and
  transmitting the electrical power to a next robot joint module of the current robot joint module in a wireless power supply mode.

Electrical power is transferred between a plurality of robot joint modules, without arranging any power cable. The cost of and difficulty in arranging power cables can be reduced, and cable breakage caused by winding of the power cables can be avoided, thereby implementing infinite continuous rotation of joints.

Therefore, electrical power can be transferred between a plurality of robot joint modules, without arranging any power cable. The cost of and difficulty in arranging power cables can be reduced, and cable breakage caused by winding of the power cables can be avoided, thereby implementing infinite continuous rotation of joints.

In one embodiment, the method further includes:
  establishing a first handshaking session with the previous robot joint module of the current robot joint module based on a wireless communication mode, and establishing a second handshaking session with the next robot joint module of the current robot joint module based on a wireless communication mode;
  receiving a power supply request from the next robot joint module of the current robot joint module based on the second handshaking session;
  sending the power supply request to the previous robot joint module of the current robot joint module based on the first handshaking session, where
  the receiving electrical power from a previous robot joint module of a current robot joint module in a wireless power supply mode includes receiving the electrical power from the previous robot joint module through a first electromagnetic resonance relationship established with the robot joint module by the previous robot joint module based on the power supply request, and
  the transmitting the electrical power to a next robot joint module of the current robot joint module in a wireless power supply mode includes establishing a second electromagnetic resonance relationship with the next robot joint module based on the power supply request, and sending the electrical power to the next robot joint module through the second electromagnetic resonance relationship.

Therefore, in the embodiments of the present invention, a power supply request can be transferred based on handshaking sessions established in a wireless communication mode, and a collaborative effect is exerted in the process of transferring electrical power with other robot joint modules.

A wireless power supply apparatus for a robot joint module, including a processor and a memory.

The memory stores an application program executable to the processor, so that the processor executes the wireless power supply method for a robot joint module according to any one of the foregoing embodiments.

Therefore, the embodiments of the present invention provide a wireless power supply apparatus including a processor and a memory.

A computer readable storage medium having computer readable instructions stored therein, where the computer readable instructions are used for executing the wireless power supply method for a robot joint module according to any one of the foregoing embodiments.

Figure 1:
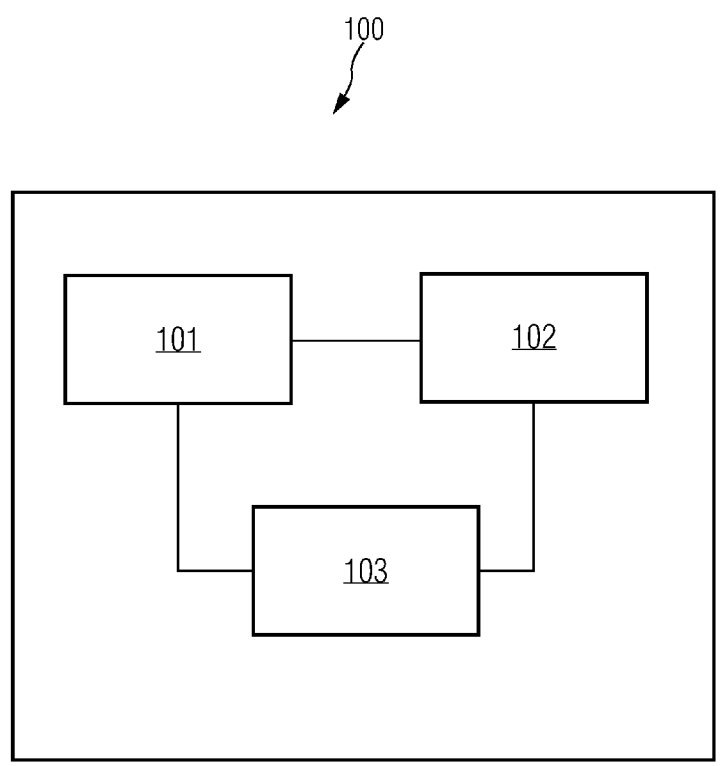
FIG. 1 is a structural diagram of a wireless power supply apparatus for a robot joint module according to embodiments of the present invention.

Reference numerals are as follows:

| Reference numeral | Meaning |
| --- | --- |
| 100 | Robot joint module |
| 101 | Wireless power receiver |
| 102 | Wireless power transmitter |
| 103 | Wireless communication module |
| 50 | Joint body |
| 51 | Connecting end |
| 52 | Output end |
| 53 | Rear cover end |
| 54 | Main board |
| 55 | Wireless power receiver |
| 56 | Wireless power transmitter |
| 401 | First robot joint module |
| 402 | Second robot joint module |
| 403 | Third robot joint module |
| 40n | $n^{th}$ robot joint module |
| 501 and 502 | Steps |
| 601 | Processor |
| 602 | Memory |
| 20 | Robot controller |
| 21 | Support |
| 22 | Bottom joint |
| 23 | Shoulder joint |
| 24 | Elbow joint |
| 25 | First wrist joint |
| 26 | Second wrist joint |
| 27 | Third wrist joint |

DETAILED DESCRIPTION

To clarify the technical solution and advantages of the present invention more clearly, the present invention is further described in detail below with reference to the accompanying drawings and embodiments. It should be understood that the specific embodiments described herein are merely used for explaining the present invention, rather than limiting the scope of protection of the present invention.

For concise and intuitive descriptions, the solution of the present invention is explained below by describing several representative embodiments. A large number of details in the embodiments are merely used to help understand the solution of the present invention. However, it is obvious that the implementation of the technical solution of the present invention may not be limited to these details. To avoid unnecessarily obscuring the solution of the present invention, some embodiments are not described in detail, but merely described in the form of frameworks. In the following text, "including" means "including but not limited to", and "according to . . . " means "at least according to . . . , but not limited to merely according to . . . ". Considering Chinese language habits, if the number of a component is not specified below, it means that there may be one or more components, or it can be understood as that there is at least one component.

Considering shortcomings of connecting robot joints through cables in the prior art, the applicant provides a technical solution in which robot joints can be connected without cable arrangement. The cost of and difficulty in arranging cables can be reduced, and cable breakage caused by winding during cable arrangement can be avoided, thereby implementing infinite continuous rotation of the joints.

A robot usually includes a bottom joint module and at least one non-bottom joint module. The bottom joint module is usually arranged on a support, or on a multi-robot mounting surface such as the ground and a wall, and a non-bottom joint is connected to the bottom joint module in a cascade manner.

FIG. 1 is a structural diagram of a wireless power supply apparatus for a robot joint module according to embodiments of the present invention. A wireless power supply apparatus shown in FIG. 1 is preferably arranged in a non-bottom joint module of a robot.

As shown in FIG. 1, the wireless power supply apparatus includes:

a wireless power receiver 101 arranged at a connecting end of one robot joint module 100 (i.e., a current robot joint module) and configured to receive electrical power from a previous robot joint module of the robot joint module 100; and a wireless power transmitter 102 arranged at an output end of the robot joint module 100 and configured to transmit the electrical power to a next robot joint module of the robot joint module 100.

The connecting end is used for connection to the previous robot joint module, and the output end is used for connection to the next robot joint module.

The wireless power receiver 101 receives the electrical power, particularly receives the electrical power from the previous robot joint module, based on the Wireless Power Consortium (WPC) standard, the Power Matters Alliance (PMA) standard, the Alliance for Wireless Power (A4WP) standard, iNPOFi, Wi-Po, and other wireless power supply technologies.

The wireless power transmitter 102 transmits the electrical power based on the WPC standard, the PMA standard, the A4WP standard, the iNPOFi technology, Wi-Po and other wireless power supply technologies, so that the next robot joint module can receive the electrical power.

Hence, based on the wireless power supply apparatus of FIG. 1, each robot joint module 100 can receive electrical power from a previous robot joint module in a wireless power supply mode, and can also send the electrical power to a next robot joint module in a wireless power supply mode. The electrical power can be transferred between a plurality of robot joint modules, without arranging any power cable. The cost of and difficulty in arranging cables can be reduced, and cable breakage caused by winding during cable arrangement can be avoided, thereby implementing infinite continuous rotation of joints.

It should be noted that a previous robot joint and a next robot joint in the present invention do not specify any up and down positional relationship, but merely indicate two different joint modules connected to a described robot joint module. In the present invention, robot joints are connected one by one, and according to the wireless power supply apparatus of the present invention, electrical power is continuously transferred so as to supply power to the joint modules.

In one embodiment, the wireless power supply apparatus further includes a wireless communication module 103. For example, the wireless communication module 103 is implemented as a Bluetooth module, a WiFi module, or the like. Preferably, the wireless communication module 103 is arranged on a main board of the robot joint module 100, where the main board is arranged at a rear cover end of the robot joint module 100.

In one aspect, the wireless communication module 103 exchanges information with any robot control device, for example, receiving a control instruction from the robot control device or report a status parameter to the robot control device. For example, the robot control device can be implemented as a robot controller or a handheld terminal. When the robot is implemented as an industrial robot, the robot control device is usually implemented as the robot controller; and when the robot is implemented as a collaborative robot, the robot control device is usually implemented as the handheld terminal.

In another aspect, the wireless communication module 103 exerts a collaborative effect in the process of transferring electrical power with other robot joint modules, for example, establishing handshaking sessions between joint modules.

The following examples illustrate exemplary applications of the wireless communication module 103:

(1) the wireless communication module 103 receives, from a robot controller, a control instruction adapted to control a robot joint module. Specifically, the control instruction is implemented as a rotating instruction of instructing the robot joint module to rotate at a degree of freedom thereof, or is implemented as a moving instruction of instructing the robot joint module to be within a moving space of a robot.

(2) The wireless communication module 103 sends a status parameter of the robot joint module to the robot controller. Specifically, the status parameter is implemented as an acceleration parameter, a speed parameter, a temperature parameter, a position parameter, or the like.

(3) The wireless communication module 103 receives, from a handheld terminal or another type of control device, a control instruction adapted to control the robot joint module. Specifically, the control instruction is implemented as a rotating instruction of instructing the robot joint module to rotate at a degree of freedom thereof, or is implemented as a moving instruction of instructing the robot joint module to be within a moving space of a robot.

(4) The wireless communication module 103 sends a status parameter of the robot joint module to the handheld terminal or another type of control device. Specifically, the status parameter is implemented as an acceleration parameter, a speed parameter, a temperature parameter, a position parameter, or the like.

(5) The wireless communication module 103 establishes, with a previous robot joint module, a first handshaking session for receiving electrical power.

(6) The wireless communication module 103 establishes, with a next robot joint module, a second handshaking session for transmitting the electrical power.

Hence, based on the wireless power supply apparatus of FIG. 1, a robot joint module can receive a control instruction from a robot control device and send a status parameter to the robot control device, without any communication cable. The cost of and difficulty in arranging cables can be reduced, and cable breakage caused by winding during cable arrangement can be avoided, thereby implementing infinite continuous rotation or movement of joints.

Moreover, the wireless communication module may further assist in electrical power transfer with other robot joint modules.

Typical examples of the wireless power supply technology and the wireless communication module are described above. Persons skilled in the art can realize that such description is exemplary and is not intended to limit the scopes of protection of the embodiments of the present invention.

Based on the foregoing descriptions, embodiments of the present invention further provide a robot joint module.

Figure 2:
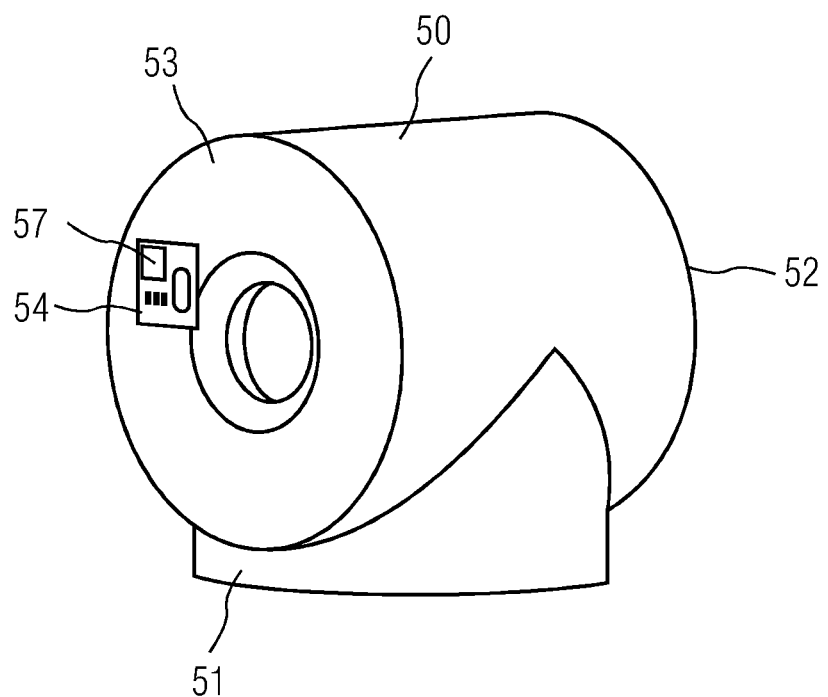
FIG. 2 is a first exemplary three-dimensional structural diagram of a robot joint module according to embodiments of the present invention.
Figure 3:
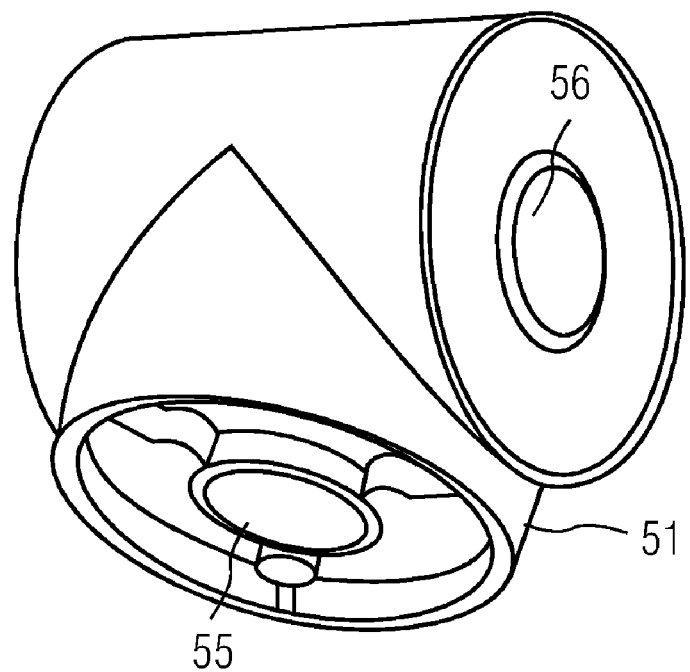
FIG. 3 is a second exemplary three-dimensional structural diagram of a robot joint module according to embodiments of the present invention.

FIG. 2 is a first exemplary three-dimensional structural diagram of a robot joint module according to embodiments of the present invention; and FIG. 3 is a second exemplary three-dimensional structural diagram of a robot joint module according to embodiments of the present invention.

It can be seen from FIG. 2 and FIG. 3 that a robot joint module includes:

a joint body 50 including a connecting end 51, an output end 52, and a rear cover end 53;

a main board 54 arranged in an inner cavity of the joint body 50 and adjacent to or abutted against the rear cover end 53;

a wireless power receiver 55 arranged in a connecting end 51 and configured to receive electrical power from a previous robot joint module (or referred to as a first joint module) of a robot joint module; and a wireless power transmitter 56 arranged at an output end 52 and configured to transmit the electrical power to a next robot joint module (or referred to as a second joint module) of the robot joint module.

The connecting end 51 is adapted to connection for the output end of the previous robot joint module; the output end 52 is adapted to connection to the connecting end of the next robot joint module; the rear cover end 53 is the end on the joint body 50 opposite to the output end 52, the rear cover end 53 is usually sealed by an end cover, and the joint body 50 includes a motor; and the main board 54 includes an inverter for driving or controlling the motor.

Preferably, as shown in FIG. 2 and FIG. 3, the joint body 50 is T-shaped when viewed from the side, the output end 52 and the rear cover end 53 are respectively located on two opposite ends of the joint body 50 in a first direction, the connecting end 51 is located on one end of the joint body 50 in a second direction, and the second direction is perpendicular to the first direction. Preferably, the connecting end 51 may be implemented as a flange base.

The wireless power receiver 55 may be arranged at any position of the connecting end 51, for example, arranged on a circumferential surface or an end surface of the connecting end 51. Preferably, the wireless power receiver 55 is arranged on the end surface of the connecting end 51. The wireless power transmitter 56 may be arranged at any position of the output end 52, for example, arranged on a circumferential surface or an end surface of the output end 52. Preferably, the wireless power transmitter 56 is arranged on the end surface of the output end 52.

Preferably, if the wireless power receiver 55 is arranged at the circumferential surface of the connecting end 51, the wireless power transmitter of the previous robot joint module is arranged at the circumferential surface of the output end of the previous robot joint module so as to be well aligned with the wireless power receiver 55 to improve electrical power transmission efficiency. If the wireless power receiver 55 is arranged at the end surface of the connecting end 51, the wireless power transmitter of the previous robot joint module is arranged at the end surface of the output end of the previous robot joint module so as to be well aligned with the wireless power receiver 55 to improve electrical power transmission efficiency. In order to achieve such precise alignment, corresponding fasteners and recesses or any mechanisms for alignment can be provided on the connecting end and the output end of the joint body.

Preferably, if the wireless power transmitter 56 is arranged at the circumferential surface of the output end 52, the wireless power receiver of the next robot joint module is arranged at the circumferential surface of the connecting end of the next robot joint module so as to be well aligned with the wireless power receiver 55 to improve electrical power transmission efficiency. If the wireless power transmitter 56 is arranged at the end surface of the output end 52, the wireless power transmitter of the previous robot joint module is arranged at the end surface of the connecting end of the previous robot joint module so as to be well aligned with the wireless power receiver 55 to improve electrical power transmission efficiency.

Preferably, the robot joint module further includes a wireless communication module 57, where the wireless communication module 57 is arranged on the main board 54, and configured to execute at least one of the following processes: receiving, from a robot controller, a control instruction adapted to control the current robot joint module; sending a status parameter of the current robot joint module to the robot controller; receiving, from a handheld terminal or another type of control device, a control instruction adapted to control the robot joint module; sending a status parameter of the robot joint module to the handheld terminal or another type of control device; establishing, with the previous robot joint module, a first handshaking session for receiving the electrical power; establishing, with the next robot joint module, a second handshaking session for transmitting the electrical power, etc.

In one embodiment, after receiving the electrical power from the previous robot joint module, the robot joint module can directly transmit the electrical power to the next robot joint module, thereby implementing real-time continuous electrical power transfer between the robot joint modules. Optionally, after receiving the electrical power from the previous robot joint module, the robot joint module can further store the electrical power in an energy storage device thereof. For example, the energy storage device is implemented as a capacitor, a rechargeable battery or the like connected to the wireless power receiver. Then, when power needs to be supplied to the motor of the robot joint module, the robot joint module can use the electrical power stored in the energy storage device to drive the motor, or the electrical power is transmitted to the next robot joint module based on the requirements.

Therefore, the embodiments of the present invention further provide a modular robot joint module. When a robot needs to be adjusted, a robot joint module to be disassembled can be removed at any time and replaced with a new robot joint module, which facilitates management and maintenance.

According to the embodiments of the present invention, the robot joint module shown in FIG. 2 and FIG. 3 can be applied to various robots, such as industrial robots, agricultural robots, household robots, medical robots, service robots, collaborative robots, space robots, underwater robots, military robots, rescue robots, educational teaching robots, entertainment robots, and the like.

Considering that the collaborative robot has strict requirements for miniaturization of the robot, and wireless connection between joint modules provided in the embodiments of the present invention can significantly reduce the size of the robot, the joint modules provided in the embodiments of the present invention are preferably implemented and applied to the collaborative robot.

Based on the foregoing descriptions, embodiments of the present invention further provide a wireless power supply system for a robot joint module.

Figure 4:
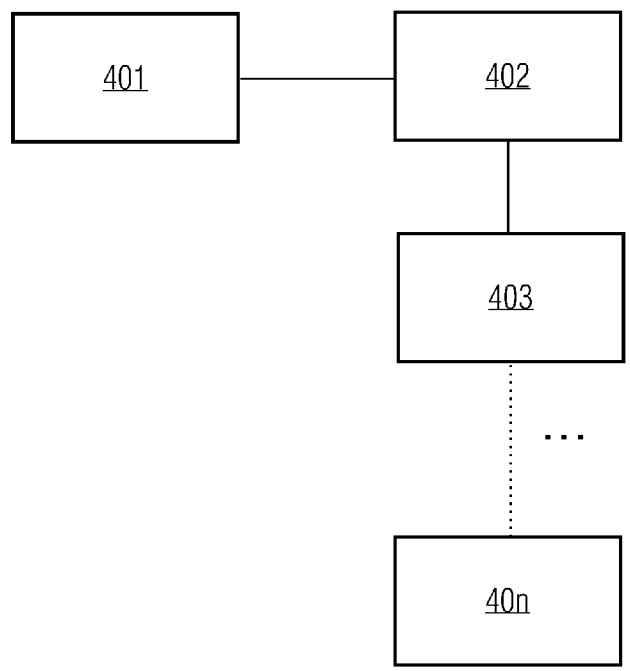
FIG. 4 is a structural diagram of a wireless power supply system for a robot joint module according to embodiments of the present invention.

FIG. 4 is a structural diagram of a wireless power supply system for a robot joint module according to embodiments of the present invention. FIG. 4 schematically illustrates that a joint module is constructed as the robot joint module shown in FIG. 2 and FIG. 3.

As shown in FIG. 4, the system includes:
a first robot joint module 401 configured to receive electrical power from a previous robot joint module of the first robot joint module in a wireless power supply mode, or receive electrical power from a robot controller in a wired power supply mode, where an output end of the first joint module 401 is connected to or abutted against a connecting end of a second joint module 402; and
the second robot joint module 402 serving as the next joint module of the first robot joint module 401, connected to or abutted against the output end of the first robot joint module 401, and configured to receive the electrical electric from the first robot joint module 401 in a wireless power supply mode.

When implemented as a bottom joint module, the first robot joint module 401 receives electrical power from a robot controller in a wired power supply mode. When implemented as a non-bottom joint module, the first robot joint module 401 receives electrical power from the previous robot joint module of the first robot joint module 401 in a wireless power supply module.

In one embodiment, the system further includes:
a third robot joint module 403 serving as the next joint module of the second robot joint module 402, connected to or abutted against an output end of the second robot joint module through a connecting end of the third robot joint module, and configured to receive the electrical power from the second robot joint module 402 in a wireless power supply mode.

By analogy, the system further includes:
an $n^{-th}$ robot joint module 40$n$ serving as the next joint module of an $(n-1)^{-th}$ robot joint module, connected to or abutted against an output end of the $(n-1)^{-th}$ robot joint module through a connecting end of the $n^{-th}$ robot joint module, and configured to receive the electrical power from the $(n-1)^{-th}$ robot joint module in a wireless power supply mode. n is a positive integer greater than or equal to 5.

Each robot joint module in the system shown in FIG. 4 includes a wireless communication module arranged on a corresponding main board. Each robot joint module receives, from a robot controller or a handhold terminal, based on the corresponding wireless communication module, a control instruction adapted to control the robot joint module. Each robot joint module further sends a status parameter thereof to the robot controller or the handhold terminal based on the corresponding wireless communication module. Moreover, each robot joint module further has the function of establishing handshaking sessions based on the corresponding wireless communication module in the process of transferring electrical power with other robot joint modules.

Based on the foregoing descriptions, embodiments of the present invention further provide a wireless power supply method for a robot joint module.

Figure 5:
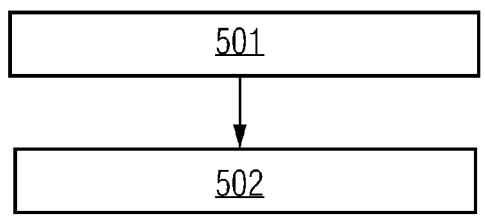
FIG. 5 is a flowchart of a wireless power supply method for a robot joint module according to embodiments of the present invention.

FIG. 5 is a flowchart of a wireless power supply method for a robot joint module according to embodiments of the present invention.

As shown in FIG. 5, the method includes:

step 501: receiving electrical power from a previous robot joint module of a current robot joint module in a wireless power supply mode, or receiving electrical power from a robot controller in a wired power supply mode; and step 502: transmitting the electrical power to a next robot joint module of the current robot joint module in a wireless power supply mode.

In one embodiment, the method further includes:

establishing a first handshaking session with the previous robot joint module of the current robot joint module based on a wireless communication mode, and establishing a second handshaking session with the next robot joint module of the current robot joint module based on a wireless communication mode; receiving a power supply request from the next robot joint module of the current robot joint module based on the second handshaking session; and sending the power supply request to the previous robot joint module of the current robot joint module based on the first handshaking session, where the receiving electrical power from a previous robot joint module of a current robot joint module in a wireless power supply mode in step 501 includes: receiving the electrical power from the previous robot joint module of the current robot joint module through a first electromagnetic resonance relationship established with the robot joint module of the current robot joint module by the previous robot joint module of the current robot joint module based on the power supply request, and the transmitting the electrical power to a next robot joint module of the current robot joint module in a wireless power supply mode in step 502 includes: establishing a second electromagnetic resonance relationship with the next robot joint module of the current robot joint module by the current robot joint module based on the power supply request, and sending the electrical power to the next robot joint module of the current robot joint module based on the second electromagnetic resonance relationship.

Based on the foregoing descriptions, embodiments of the present invention further provide a wireless power supply apparatus for a robot joint module.

Figure 6:
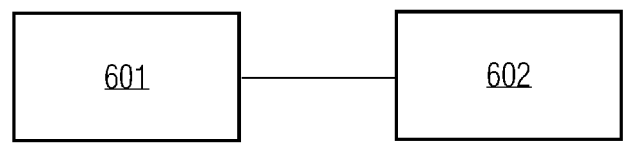
FIG. 6 is a structural diagram of a wireless power supply apparatus for a robot joint module according to embodiments of the present invention.

FIG. 6 is a structural diagram of a wireless power supply apparatus for a robot joint module according to embodiments of the present invention.

The wireless power supply apparatus includes a processor and a memory; and the memory stores an application program executable to the processor, so that the processor executes the wireless power supply method for a robot joint module according to any one of the foregoing embodiments.

Embodiments of the present invention are described by taking a series six-axis robot as an example.

Figure 7:
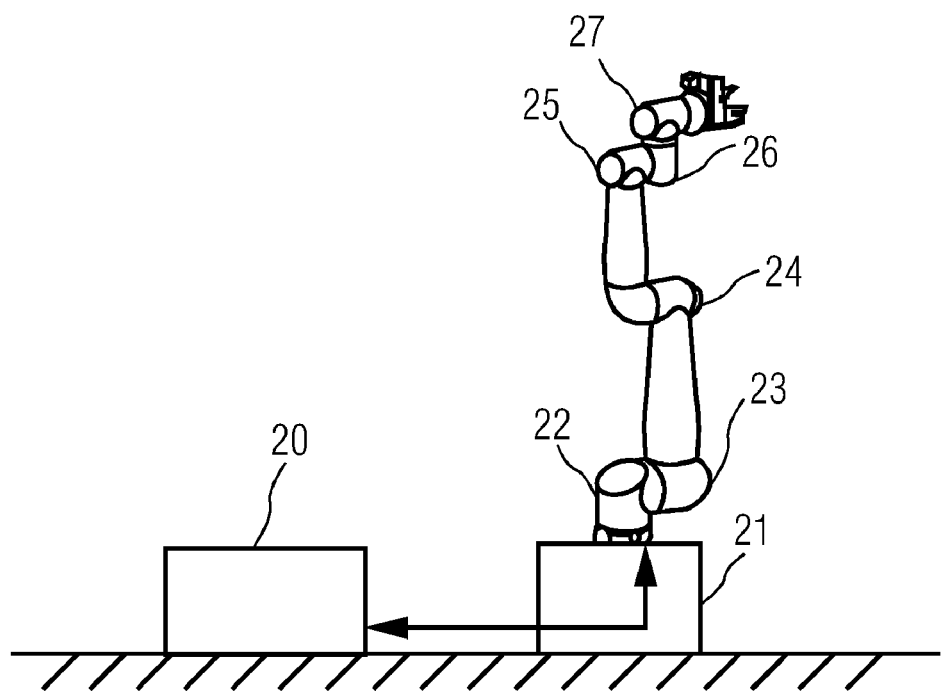
FIG. 7 is a schematic diagram of wireless power supply of a series six-axis robot according to embodiments of the present invention.

FIG. 7 is a schematic diagram of wireless power supply of a series six-axis robot according to embodiments of the present invention.

In FIG. 7, a six-axis robot includes a bottom joint 22, a shoulder joint 23, an elbow joint 24, a first wrist joint 25, a second wrist joint 26, and a third wrist joint 26, where the shoulder joint 23, the elbow joint 24, the first wrist joint 25, the second wrist joint 26, and the third wrist joint 26 are non-bottom joints.

the wireless power supply apparatus shown in FIG. 1 is separately arranged in each of the non-bottom joints including the shoulder joint 23, the elbow joint 24, the first wrist joint 25, the second wrist joint 26, and the third wrist joint 26.

The bottom joint 22, the shoulder joint 23, the elbow joint 24, the first wrist joint 25, the second wrist joint 26, and the third wrist joint 26 have respective degrees of freedom. The bottom joint 22 is arranged on a support 21; the shoulder joint 23 is connected in series to the bottom joint 22; the elbow joint 24 is connected in series to the shoulder joint 23; the first wrist joint 25 is connected in series to the elbow joint 24; the second wrist joint 26 is connected in series to the first wrist joint 25; and the third wrist joint 26 is connected in series to the second wrist joint 26.

For example, when power needs to be supplied to the elbow joint 24, a built-in wireless communication module of the elbow joint 24 establishes wireless communication connection with a wireless communication module in the shoulder joint 23, and sends a power supply request to the wireless communication module in the shoulder joint 23 based on the wireless communication connection. The wireless communication module in the shoulder joint 23 establishes wireless communication connection with a wireless communication module in the bottom joint 22, and sends to the bottom joint 22 the power supply request sent by the shoulder joint 23 based on the wireless communication connection.

After the wireless communication module in the bottom joint 22 receives the power supply request, electrical power is received from a robot controller 20 in a wired power supply mode, and a built-in wireless power transmitter of the bottom joint is used to send the electrical power to a wireless power receiver in the shoulder joint 23 in a wireless power supply mode. After the wireless power receiver in the shoulder joint 23 receives the electrical power provided by the bottom joint 22, a built-in wireless power transmitter of the shoulder joint is used to send the electrical power to a wireless power receiver in the elbow joint 24 in a wireless power supply mode. The wireless power receiver in the elbow joint 24 receives the electrical power, and then uses the electrical power to drive a motor in the elbow joint 24.

For another example, when power needs to be supplied to the first wrist joint 25, a built-in wireless communication module of the first wrist joint 25 establishes wireless communication connection with a wireless communication module in the elbow joint 24, and sends a power supply request to the wireless communication module in the elbow joint 24 based on the wireless communication connection. The wireless communication module in the elbow joint 24 establishes wireless communication connection with a wireless communication module in the shoulder joint 23, and sends to the shoulder joint 23 the power supply request sent by the first wrist joint 25 based on the wireless communication connection. The wireless communication module in the shoulder joint 23 establishes wireless communication connection with a wireless communication module in the bottom joint 22, and sends to the bottom joint 22 the power supply request sent by the first wrist joint 25 based on the wireless communication connection.

After the wireless communication module in the bottom joint 22 receives the power supply request, electrical power is received from a robot controller 20 in a wired power supply mode, and a built-in wireless power transmitter of the bottom joint is used to send the electrical power to a wireless power receiver in the shoulder joint 23 in a wireless power supply mode. After the wireless power receiver in the shoulder joint 23 receives the electrical power provided by the bottom joint 22, a built-in wireless power transmitter of the shoulder joint is used to send the electrical power to a wireless power receiver in the elbow joint 24 in a wireless power supply mode. After the wireless power receiver in the elbow joint 24 receives the electrical power, a built-in wireless power transmitter of the elbow joint is used to send the electrical power to a wireless power receiver in the first wrist joint 25 in a wireless power supply mode. The wireless power receiver of the first wrist joint 25 receives the electrical power, and then uses the electrical power to drive a motor in the first wrist joint 25.

Moreover, when any one or more of the bottom joint 22, the shoulder joint 23, the elbow joint 24, the first wrist joint 25, the second wrist joint 26, and the third wrist joint 26 fails, the failed joint can be removed at any time and replaced with a new joint.

The embodiments of the present invention are described in detail above by taking the six-axis robot as an example. Persons skilled in the art can realize that the present invention can also be applied to other types of robots such as a four-axis robot. The embodiments of the present invention are not limited thereto.

It should be noted that not all steps and modules in the foregoing processes and structural diagrams are necessary, and some steps or modules can be ignored according to actual requirements. The execution order of the steps is not fixed and can be adjusted as needed. The division of modules is merely division of functions used to facilitate description. In actual implementation, a module may be implemented as multiple modules, and functions of multiple modules may also be achieved by a same module; and the modules may be located in a same device or may be located in different devices.

Hardware modules in each embodiment may be implemented mechanically or electronically. For example, one hardware module may include a specially designed permanent circuit or a logic device (such as a dedicated processor, such as FPGA or ASIC) to complete specific operations. The hardware modules may also include programmable logic devices or circuits temporarily configured by software (for example, including general-purpose processors or other programmable processors) to execute specific operations. Specifically implementing the hardware modules by using mechanical methods, dedicated permanent circuits, or circuits temporarily configured (such as configured by software) can be determined by taking the cost and time into consideration.

The present invention further provides a machine-readable storage medium, which stores instructions for causing a machine to implement the method according to the text above. Specifically, a system or apparatus equipped with a storage medium may be provided, software program code for implementing functions of any one of the foregoing embodiments is stored on the storage medium, and a computer (or a CPU or an MPU) of the system or apparatus reads and executes the program code stored in the storage medium. In addition, an operating system or the like operating on the computer can also be used to complete part or all of actual operations through program code-based instructions. Moreover, the program code read from the storage medium can be written to a memory provided in an expansion board inserted into the computer or to a memory provided in an expansion unit connected to the computer, and then the program code-based instructions cause the CPU or the like installed on the expansion board or the expansion unit to execute part or all of the actual operations, so as to implement the functions of any one of the foregoing embodiments.

Implementations of the storage medium for providing the program code include floppy disks, hard disks, magneto-optical disks, optical disks (such as CD-ROM, CD-R, CD-RW, DVD-ROM, DVD-RAM, DVD-RW, and DVD+RW), magnetic tapes, non-volatile memory cards, and ROMs. Optionally, the program code can be downloaded from a server computer via a communication network.

The foregoing descriptions are merely preferred embodiments of the present invention, but are not intended to limit the scope of protection of the present invention. Any modifications, equivalent substitutions, improvements, etc. made within the spirit and principle of the present invention.

The invention claimed is:

1. A wireless power supply apparatus for a robot joint module, comprising:
    a wireless power receiver arranged at a connecting end of a current robot joint module and adapted to receive electrical power from a previous robot joint module that is connected to the current robot joint module;
    a wireless power transmitter arranged at an output end of the current robot joint module and adapted to transmit the electrical power to a next robot joint module that is connected to the current robot joint module; and
    a wireless communication module disposed on the current robot joint module and programmed to perform at least the following processes:
        establish a first handshake conversation with the previous robot joint module, the first handshake conversation facilitating transmission of electrical power from the previous robot joint module to the current robot joint module; and
        establish a second handshake conversation with the next robot joint module, the second handshake conversation facilitating transmission of electrical power from the current robot joint module to the next robot joint module.

2. The wireless power supply apparatus for a robot joint module according to claim 1, wherein the wireless communication module is further programmed to execute at least one of the following processes:
    receive, from a robot controller, a control instruction adapted to control the current robot joint module;
    send a status parameter of the current robot joint module to the robot controller;
    receive, from a handheld terminal, a control instruction adapted to control the current robot joint module; or
    send a status parameter of the current robot joint module to the handheld terminal.

3. The wireless power supply apparatus for a robot joint module according to claim 1, wherein the wireless communication module is arranged inside a joint body of the robot joint module.

4. A robot joint module, comprising:
    a joint body comprising a connecting end, an output end, and a rear cover end;
    a main board arranged inside the joint body;
    a wireless power receiver arranged at the connecting end and adapted to receive electrical power from a previous robot joint module that is connected to the joint body;

a wireless power transmitter arranged at the output end and adapted to transmit the electrical power to a next robot joint module that is connected to the joint body; and a wireless communication module disposed on the main board and programmed to perform at least the following processes:

establish a first handshake conversation with the previous robot joint module, the first handshake conversation facilitating transmission of electrical power from the previous robot joint module to the wireless power receiver; and establish a second handshake conversation with the next robot joint module, the second handshake conversation facilitating transmission of electrical power from the wireless power transmitter to the next robot joint module.

5. The robot joint module according to claim 4, wherein: the wireless communication module is programmed to execute at least one of the following processes:

receive, from a robot controller, a control instruction;
send a status parameter to the robot controller;
receive, from a handheld terminal, a control instruction; or
send a status parameter to the handheld terminal.

6. The robot joint module according to claim 4, wherein the wireless power receiver is arranged on an end surface of the connecting end.

7. The robot joint module according to claim 4, wherein the wireless power transmitter is arranged on an end surface of the output end.

8. A robot, comprising the robot joint module according to claim 4.

9. The robot according to claim 8, wherein the robot is a collaborative robot.

10. A wireless power supply method for a current robot joint module, the method comprising the current robot joint module:

establishing a first handshaking session with a previous robot joint module using a wireless communication mode, and establishing a second handshaking session with a next robot joint module using a wireless communication mode;

receiving a power supply request from the next robot joint module based on the second handshaking session;

transmitting the power supply request to the previous robot joint module based on the first handshaking session;

receiving electrical power from the previous robot joint module or receiving electrical power from a robot controller in a wired power supply mode; and transmitting the electrical power to a next robot joint module.

11. The wireless power supply method for the current robot joint module according to claim 10, wherein:

the receiving electrical power from a previous robot joint module comprises receiving the electrical power from the previous robot joint module through a first electromagnetic resonance relationship established with the current robot joint module by the previous robot joint module based on the power supply request, and the transmitting the electrical power to a next robot joint comprises establishing a second electromagnetic resonance relationship with the next robot joint module based on the power supply request, and sending the electrical power to the next robot joint module through the second electromagnetic resonance relationship.

12. A wireless power supply apparatus for a robot joint module, comprising a processor and a memory, wherein the memory stores an application program executable to the processor, so that the processor executes the wireless power supply method for a robot joint module according to claim 10.

13. A non-transitory computer readable storage medium having computer readable instructions stored therein, wherein the computer readable instructions are used for executing the wireless power supply method for a robot joint module according to claim 10.

14. The wireless power supply apparatus for a robot joint module according to claim 1, wherein the current robot joint module includes a body having an outer surface, the wireless communication module being provided on the outer surface of the body.

* * * * *